United States Patent [19]
Bharadhwaj

[11] Patent Number: 6,088,779
[45] Date of Patent: Jul. 11, 2000

[54] SYSTEM AND METHOD FOR EXECUTION MANAGEMENT OF COMPUTER PROGRAMS

[75] Inventor: Rajeev Bharadhwaj, Aurora, Colo.

[73] Assignee: Fujitsu Limited, Japan

[21] Appl. No.: 08/778,213

[22] Filed: Dec. 30, 1996

[51] Int. Cl.[7] .................................................. G06F 12/10
[52] U.S. Cl. .......................................... 711/206; 711/147
[58] Field of Search .................................... 711/202, 203, 711/206, 209, 147

[56] References Cited

U.S. PATENT DOCUMENTS

| | | | |
|---|---|---|---|
| 4,503,499 | 3/1985 | Mason et al. ............................. | 395/671 |
| 4,918,653 | 4/1990 | Johri et al. .......................... | 340/825.31 |
| 5,182,805 | 1/1993 | Campbell ................................ | 711/163 |
| 5,193,189 | 3/1993 | Flood et al. ............................ | 395/673 |
| 5,319,760 | 6/1994 | Mason et al. ............................ | 711/208 |
| 5,619,696 | 4/1997 | Nakagawa ............................... | 395/670 |
| 5,771,383 | 6/1998 | Magee et al. ........................... | 395/680 |
| 5,835,764 | 11/1998 | Platt et al. ............................... | 395/671 |

OTHER PUBLICATIONS

Rashid et al., "Machine–Independent Virtual Memory Management for Paged Uniprocessor and Multiprocessor Architectures," IEEE Transactions on Computers, vol. 37, No. 8, Aug. 1988, pp. 896–907.

*Primary Examiner*—Eddie P. Chan
*Assistant Examiner*—Kevin L. Ellis
*Attorney, Agent, or Firm*—Carr & Ferrell LLP

[57] ABSTRACT

A system for managing execution of a computer program. A domain array is used to reduce the overhead associated with managing multiple instances of a computer program. A portion of virtual address space is reserved for multiple instances of the computer program, each instance having virtual address space reserved for program code and data. The virtual addresses of the program code for the plurality of instances are mapped to shared physical address space having the executable code. The virtual addresses of data for the plurality of instances are mapped to respective dedicated portions of physical address space having data for the plurality of instances.

21 Claims, 10 Drawing Sheets

SYSTEM AND METHOD FOR EXECUTION MANAGEMENT OF COMPUTER PROGRAMS

BACKGROUND OF THE INVENTION

1. Field of the Invention

The present invention generally relates to operating system management of virtual address space and physical address space, and more particularly to coordination of the sharing of address space between computer processes.

2. Description of Background Art

The manner in which the computing resources of a computer system are managed by an operating system may have a significant impact on the performance levels of various application programs. The performance levels will be observable by those using the application programs. An example class of application programs where management of the computing resources is important has programs that provide access to remote users. The class of application programs includes the well known programs httpd (hypertext transport protocol daemon), CGI (common gateway interface) scripts, ftpd (file transport protocol daemon), terminal sessions, etc. The operating system must allocate processor time and memory space between the application programs.

Because the nature of each application program in this class of application programs is that multiple users execute the same application program, various approaches have been tried to efficiently allocate the computer system resources between the multiple users executing the same application program. Dedicated processes, multi-threading, and reusable processes are three such approaches.

The approach having dedicated processes has a dedicated process for each user of the application program. Each process has executable code, data, and stack information contained in a dedicated virtual address space, and each process has code executed and data manipulated in dedicated physical address space. The drawback to dedicated processes is that they are relatively expensive to manage in terms of processor and memory resources.

Creating, context switching, and deleting computer processes is expensive in terms of the time spent by a computer operating system in performing these functions. To create a process, virtual address space must be allocated and physical memory space must be mapped; to switch to another process, physical memory space must be remapped to execute the other process; and when a process is finished, the virtual address space must be freed for other processes.

The approach having reusable processes has a fixed number of processes which are available to process user tasks. A user initiated task is queued until a process becomes available to perform the task. The reusable process approach eliminates having to create and destroy a process after a task is complete. However, context switching is as expensive as with dedicated processes, and additional programming is required to manage the task queue. In addition, each process will have to be programmed to initialize and destroy data for performing each request.

The multi-thread approach has multiple threads of program execution in a shared address space. A predetermined number of threads are permitted where there is a thread for each user initiated task. The multi-thread approach is advantageous because there is low overhead in initiating a thread, switching between threads of execution, and destroying a thread. However, for an existing application program which is not multi-threaded, conversion to a multi-threaded application program requires additional programming to separate private data of a thread from data shared between threads, and to program locks for the shared data.

Therefore, it would be desirable to have a system that reduces the overhead involved in running a computer program which may be initiated by multiple users without requiring extensive additional programming for the application.

SUMMARY OF THE INVENTION

The present invention is a system and method for execution management of computer programs. In managing the execution of a computer program, the system manages memory allocation for and context switching between executing instances of the computer program.

A portion of virtual address space is reserved for multiple instances of the computer program, each instance having virtual address space reserved for program code and data. The virtual addresses of the program code for the plurality of instances are mapped to shared physical address space having the executable code. The virtual addresses of data for the plurality of instances are mapped to respective dedicated portions of physical address space having data for the plurality of instances.

The aforementioned mappings are static in that they exist so long as the computer program is made available to process requests. An instance of the computer program is created when a request to be processed by the computer program is received. To create an instance, the program counter is updated to reference code shared by the instances, but no memory re-mappings are required because the mappings are pre-established. Computer systems having a large virtual address space support the stated mappings.

To switch from processing a first instance to processing another instance, processing overhead is reduced because the instances all reside in the same virtual address space and a switch involves minimal overhead along with changing the program counter.

DETAILED DESCRIPTION

Figure 1:
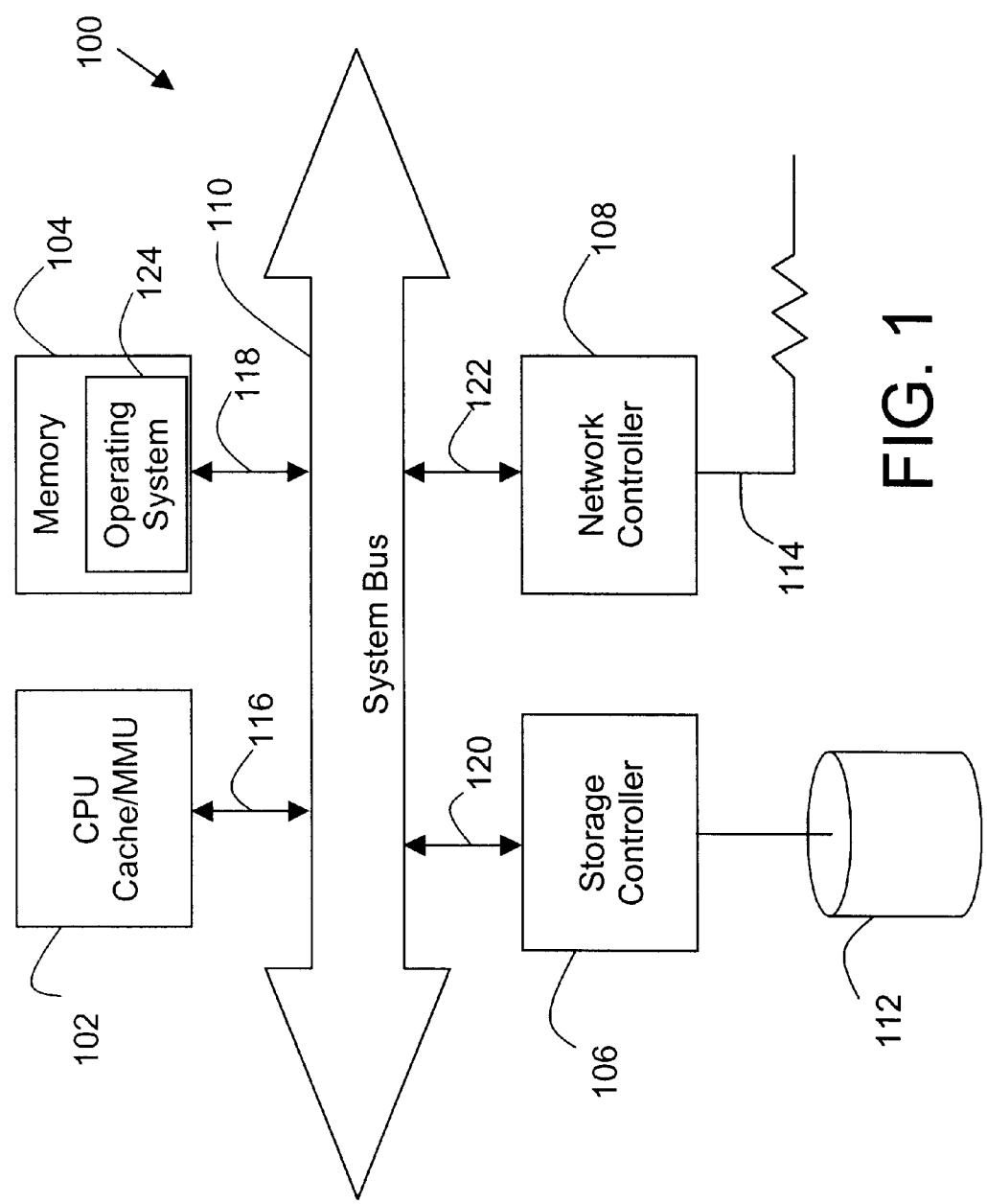
FIG. 1 is a functional block diagram of an exemplary computer system 100 in which the present invention may be used.

FIG. 1 is a functional block diagram of an exemplary computer system 100 in which the present invention may be used. The system includes a CPU 102, a memory 104, a storage controller 106, a network controller 108, and a system bus 110. The exemplary system 100 may be a HALSTATION computer from HAL Computers, Inc. The CPU 102 is available for execution of program instructions stored in the memory 104. A cache and memory management unit (MMU) are included in the CPU 102. The MMU maps virtual addresses generated by the CPU 102 to physical addresses of the memory 104.

The storage controller 106 controls access to the non-volatile storage provided by disk 112. The network controller 108 controls access to network 114.

The CPU 102, memory 104, storage controller 106, and network controller 108 are respectively coupled to the system bus 110 via lines 116, 118, 120, and 122. System bus 110 includes control, address, and data lines for transferring addresses and data between the coupled units.

An operating system 124 is stored in the memory 104 and includes program instructions that are executed by CPU 102. The operating system 124 manages the computing resources available in the system 100. Relative to the present invention, the operating system 102 manages the sharing of the CPU 102 between multiple different computer programs (not shown) and manages the allocation of virtual address space as well as physical address space available in the memory 104 to the various computer programs which are executing in the system 100.

Figure 2:
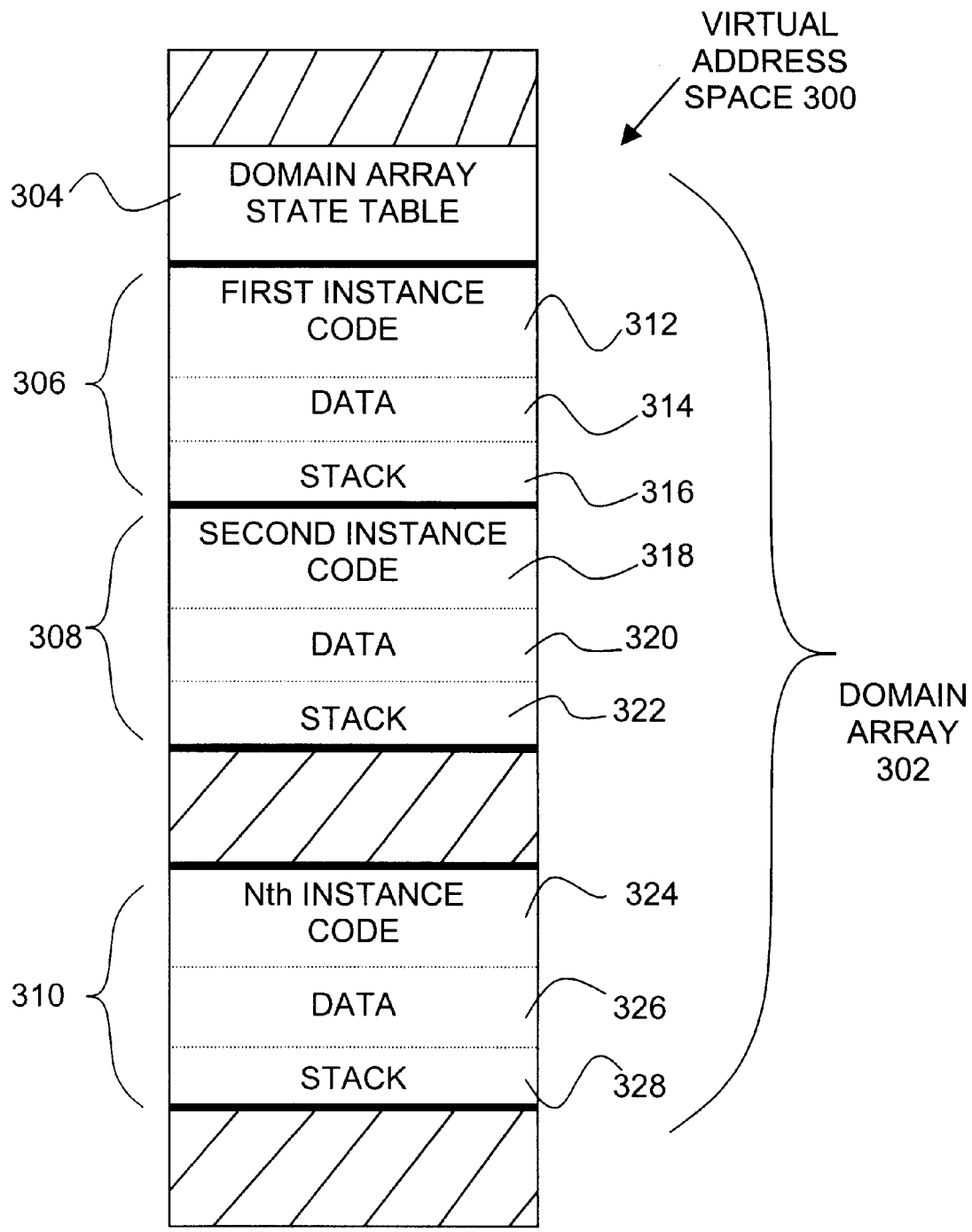
FIG. 2 is a pictorial diagram of a portion of virtual address space reserved for a domain array.

FIG. 2 is a pictorial diagram of a portion of virtual address space 300 reserved for a domain array 302. The domain array 302 includes a domain array state table 304 and portions 306, 308, and 310 for n instances. Note that n is a predetermined number which may be selected based on the hardware configuration of the system 100 and desired performance objectives.

Each portion 306, 308, 310 of virtual address space 300 includes a code section, a data section, and a stack section. For example, section 312 is reserved for the code of the first instance, section 314 is reserved for data of the first instance, and section 316 is reserved for the stack of the first instance. Similarly, sections 318, 320, and 322 are reserved for the second instance, and sections 324, 326, and 328 are reserved for the $n^{th}$ instance.

Each of the code sections 312, 318, and 324 is mapped to the same portion of physical address space in the memory 104. In contrast, each of the data and stack sections 314, 316, 320, 322, 326, and 328 are mapped to different portions of the physical address space.

Figure 3:
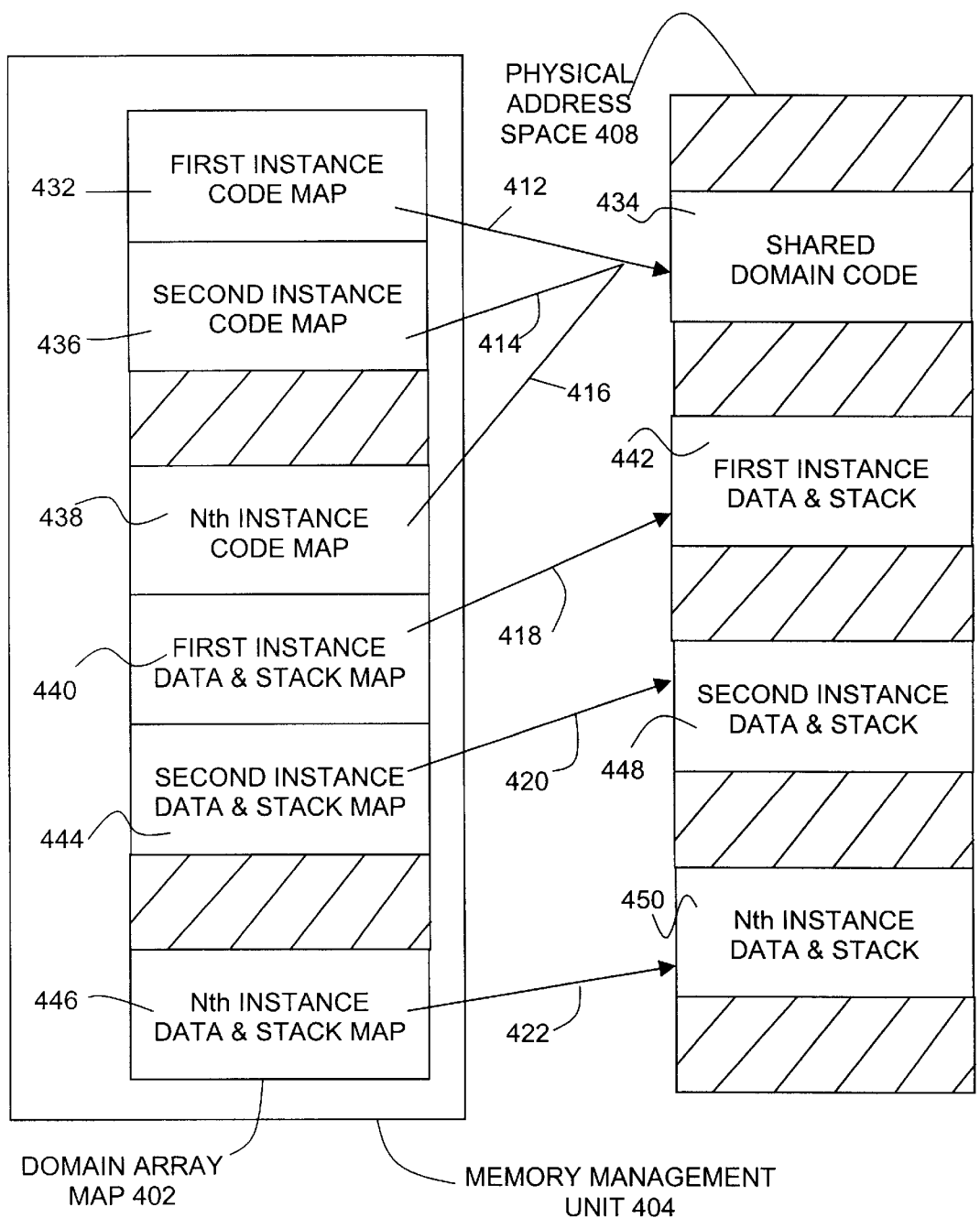
FIG. 3 shows the virtual address to physical address mappings established for n instances in the domain array.

FIG. 3 shows the virtual address to physical address mappings established for n instances in the domain array 302. The domain array map 402 includes the mappings for the code, data, and stack sections 312-328 for each of the instances and is included in the memory management unit 404 of the CPU 102. The mappings are established and maintained by the operating system 124. The domain array memory map 402 maps virtual addresses of the domain array 302 to physical addresses in the physical address space 408. The physical address space 408 is provided by the memory 104.

The directional lines 412, 414, 416, 418, 420, and 422 that connect the domain array map 402 to portions of physical address space 408 represent the mappings of the virtual addresses to the physical addresses. For example, the first instance code map 432 maps the virtual address of the first instance code 312 to the physical address of the shared domain code 434. Note that the second instance code map 436 and $n^{th}$ instance code map 438 also map to the shared domain code 434.

The data section 314 and stack section 316 of the first instance are mapped in the map 440 from virtual address space 300 to a portion 442 of physical address space 408 which is reserved for the data and stack area of the first instance. Similarly, maps 444 and 446 are used respectively for the second and $n^{th}$ instances. The virtual addresses of the data 320 and stack area 322 for the second instance are mapped to portion 448 of the physical address space 408. The virtual addresses of the data 326 and stack area 328 for the $n^{th}$ instance are mapped to portion 450 of the physical address space 408. Note that a respective, dedicated portion of physical address space is reserved for the data and stack areas of each of the instances.

Figure 4:
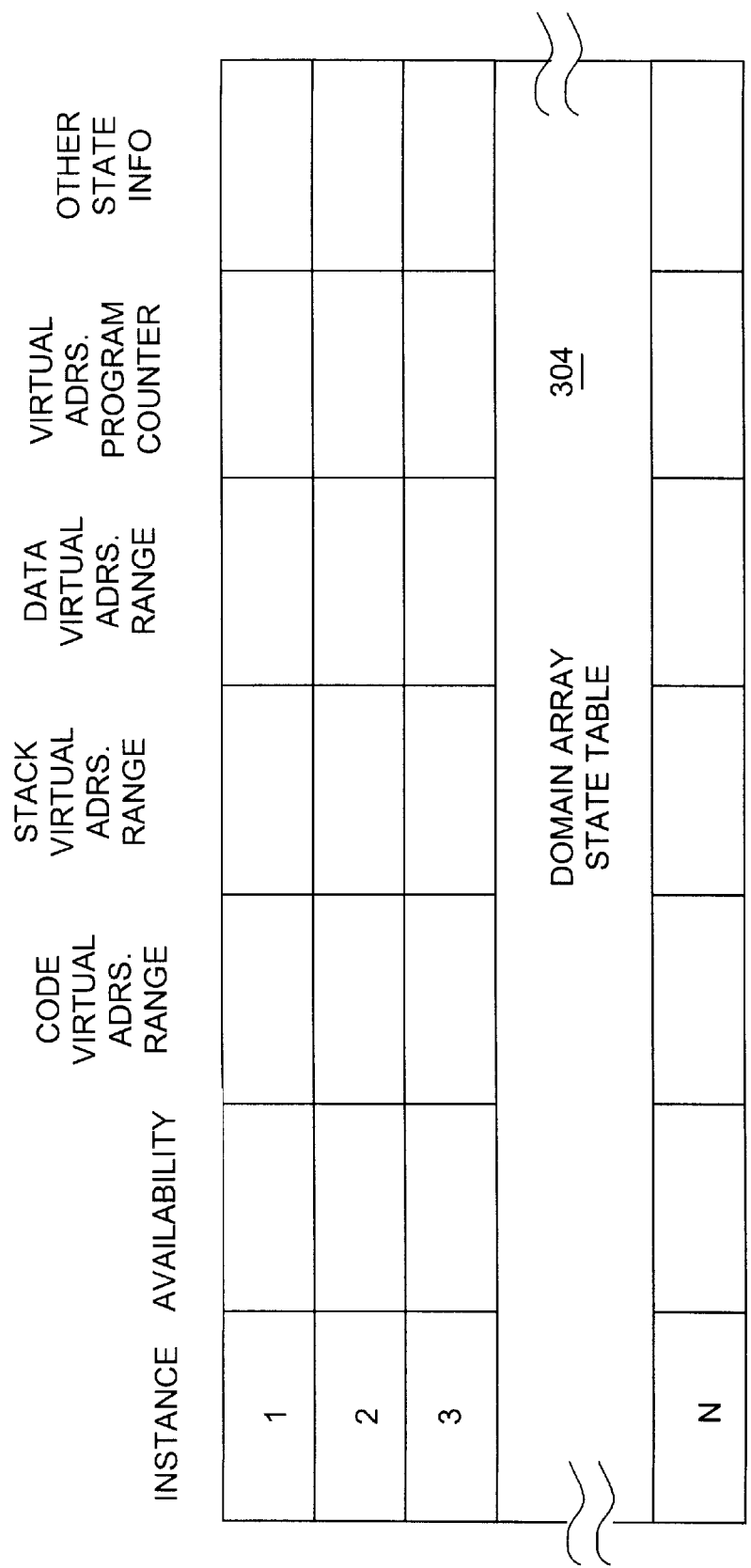
FIG. 4 shows the content of the domain array state table.

FIG. 4 shows the content of the domain array state table 304. The domain array state table 304 is used to manage the virtual address space 300 of the domain array 302. The domain array state table 304 has a respective entry for each of the n available instances. Each entry includes an availability flag, a code virtual address range, a stack virtual address range, a data virtual address range, and a virtual address program counter.

The availability flag indicates whether the virtual address space reserved for the associated instance is in use for processing a request. The code virtual address range designates the portion of virtual address space 300 allocated to the associated instance. Similarly, the stack virtual address range and the data virtual address range respectively designate the portions of virtual address space allocated to the associated instance.

The virtual address program counter is used when switching between execution of one instance by the CPU 102 to execution of another instance, and for switching between execution of an instance and a different computer program. The virtual address program counter for the associated instance is stored in the cell for the virtual address program counter when the CPU switches from execution of the associated instance. The value saved in the cell for the virtual address program counter is restored to the system program counter when execution of the associated instance is resumed. Other state information, such as file input/output status and signal information, may also be maintained in the domain array state table 304.

Figure 5A:
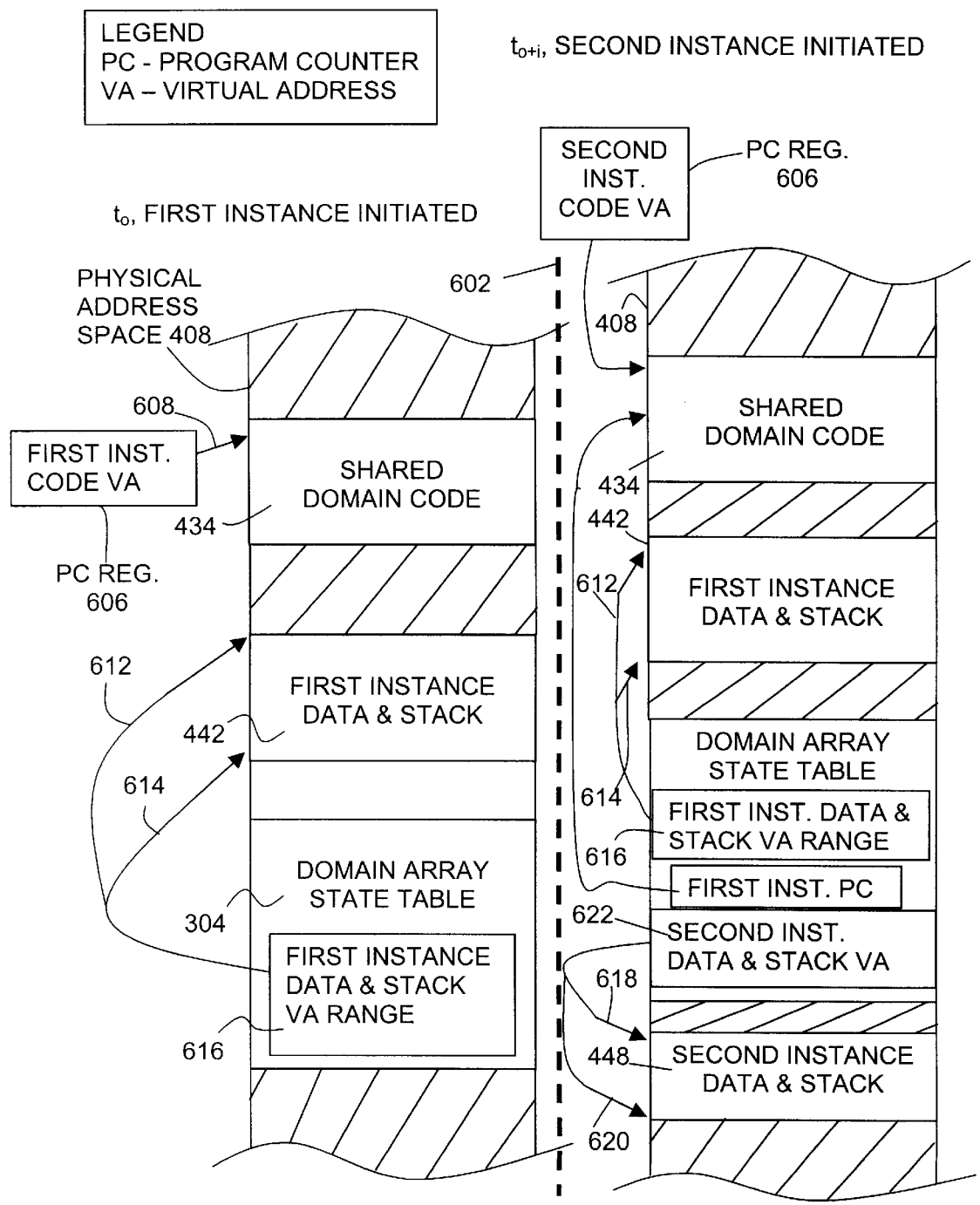
FIGS. 5A and 5B contain snapshot views of physical address space in an exemplary scenario where multiple instances in a domain array are initiated and where context switching occurs between the instances.
Figure 5B:
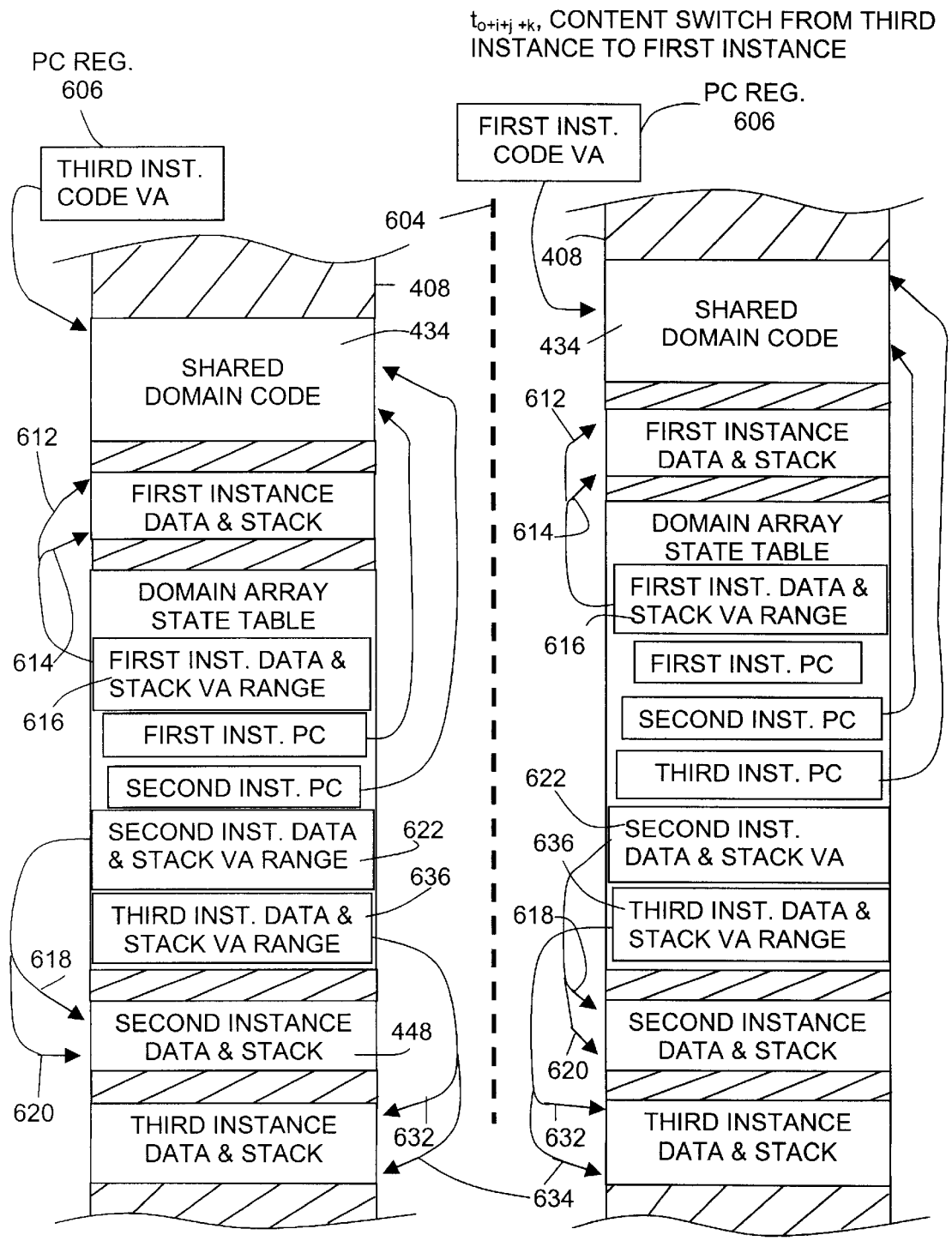

FIGS. 5A and 5B contain snapshot views of physical address space in an exemplary scenario where multiple instances in a domain array 302 are initiated and where context switching occurs between the instances. The snapshot views are at times $t_0$, $t_{0+i}$, $t_{0+i+j}$, and $t_{0+i+j+k}$, where i, j, and k are greater than 0. The snapshot views are separated by dashed line 602 in FIG. 5A and dashed line 604 in FIG. 5B. At time $t_0$, a first instance is initiated, at time $t_{0+i}$, a second instance is initiated, at time $t_{0+i+j}$, a third instance is initiated, and at time $t_{0+i+j+k}$, the CPU 102 is switched from execution of the shared domain code 434 on behalf of the third instance to execution of the shared domain code on behalf of the first instance.

When the first instance is initiated at time to, the program counter register 606 is loaded with the virtual address of the code section 312 for the first instance in the domain array 302. Line 608 shows the mapping of the address in the program counter register 606 to the shared domain code portion 434 of the physical address space 408. The portion 442 of physical address space for the data and stack area of the first instance is also established, and the domain array state table is updated with the data associated with the first instance. In particular, the entry in the table for the first instance is marked as unavailable by clearing the availability flag, and the stack virtual address range and data virtual address range are updated to reference the sections 314 and 316 of virtual address space 300 of the data and stack area of the first instance. Lines 612 and 614 represent the mapping of virtual addresses to the physical address space 408. It should be noted that block 616 includes the cells for both the stack virtual address range and data virtual address range of the domain array state table 304 as illustrated in FIG. 4.

At time $t_{0+i}$, the second instance is initiated, and the CPU 102 is switched from executing the shared domain code 434 on behalf of the first instance to executing shared domain code 434 on behalf of the second instance. Thus, the contents of the program counter are saved in the cell for the program counter of the first instance in the domain array state table 304, the program counter register 606 is loaded with the virtual address of the code 318 for the second instance, and the cells for the stack and data virtual address ranges for the second instance are initialized. Lines 618 and 620 represent the mapping of virtual addresses of the data and stack to the physical address space 408. It should be noted that block 622 includes the cells for both the stack virtual address range and data virtual address range of the domain array state table 304 as illustrated in FIG. 4.

Time $t_{0+i+j}$ shows the initiation of the third instance and the CPU 102 being switched from executing the second instance to the third instance. The contents of the program counter are saved in the cell for the program counter of the second instance in the domain array state table 304, the program counter register 606 is loaded with the virtual address of the code for the third instance, and the cells for the stack and data virtual address ranges for the third instance are initialized. Lines 632 and 634 represent the mapping of virtual addresses of the data and stack to the physical address space 408. It should be noted that block 636 includes the cells for both the stack virtual address range and data virtual address range of the domain array state table 304 as illustrated in FIG. 4.

At time $t_{0+i+j+k}$, the CPU is switched from executing the shared domain code 434 on behalf of the third instance to executing the shared domain code on behalf of the first instance. The contents of the program counter are saved in the cell for the program counter of the third instance in the domain array state table 304, and the program counter 606 is loaded with the saved program counter for the first instance. Note that the program counter of the first instance was saved in the domain array state table in the program counter cell associated with the first instance.

The preceding example illustrates that the domain array 302 method for managing memory space for a computer program reduces the overhead involved in creating an executable instance of the computer program. The overhead is reduced because the domain instances share the same domain code 434 in physical address space. In addition, swap space which is reserved by the operating system 124 may be reused when one instance completes its processing and another instance is initiated. The static data and stack mappings that are established for a first instance can be reused for another instance when the first instance completes. However, there is some overhead in setting the initial values for the data and stack at creation time.

The preceding example also illustrates that overhead is reduced for context switching between two instances. The overhead is reduced because the mappings in the memory management unit 404 do not need to be changed, only the program counter 606 and register state information needs to be saved.

Figure 6:
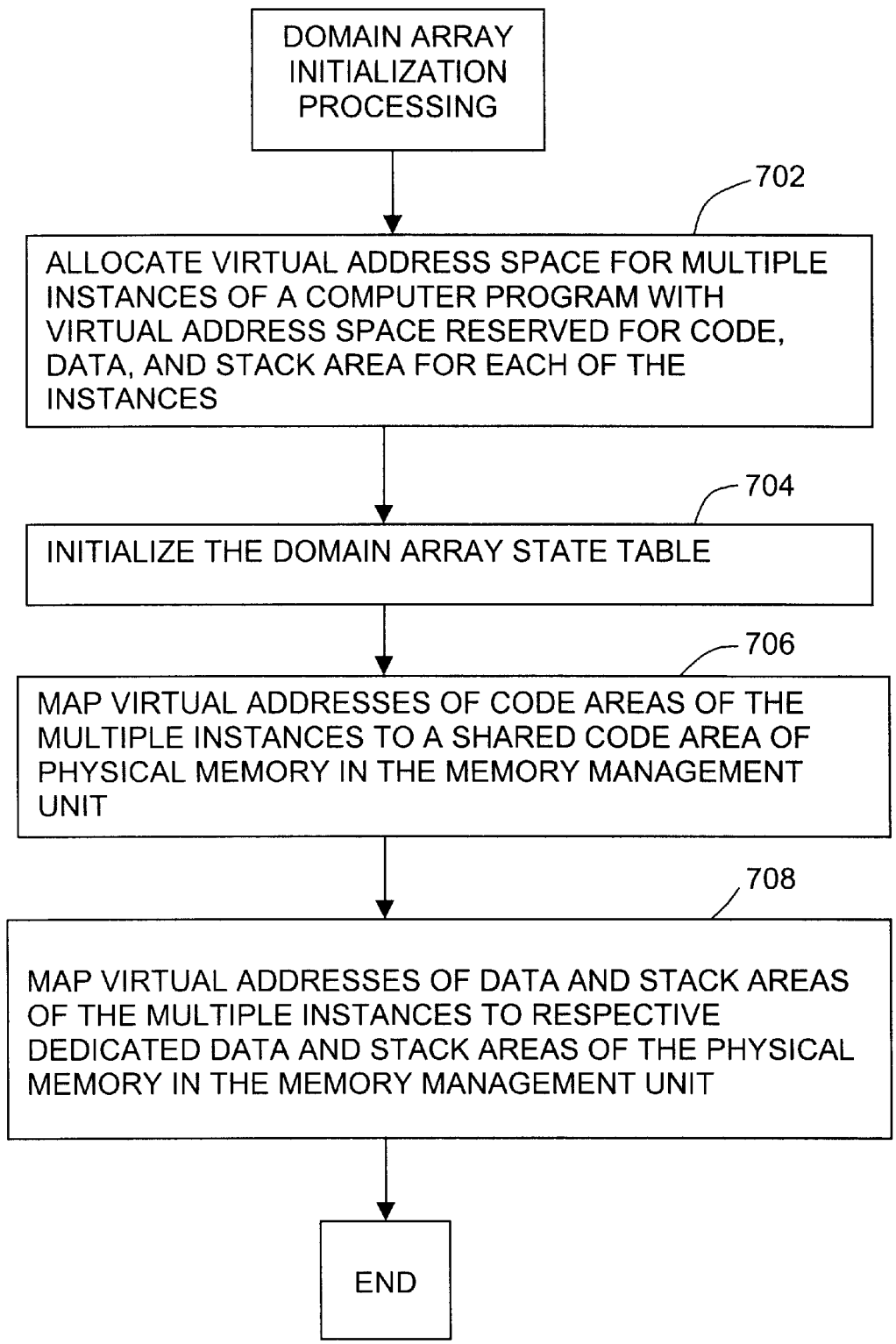
FIG. 6 is a flowchart of the processing performed by the operating system in initializing a domain array.

FIG. 6 is a flowchart of the processing performed by the operating system 124 in initializing a domain array 304. At step 702, virtual address space is allocated for multiple instances of the computer program. An "instance" of the computer program refers to virtual address space which is reserved for executable program instructions, data, and stack space for the computer program in processing a request. In the preferred system, virtual address space is established for a predetermined number of instances. The predetermined number may vary according to the amount of available physical memory 104, the number of CPUs 102, other applications programs utilized in the computer system 100 and system performance requirements. One of the instances is reserved for use as a template which is used for initialization of an instance when an instance is created.

The domain array state table 304 is initialized at step 704. Each instance is marked as available by setting the associated availability flag, and the address ranges for the code, data, and stack area are initialized. The virtual address program counter for each of the instances is set to the virtual address of the first instruction to be executed within the associated code section 312, 318, or 324.

At step 706, the domain array map 402 in the memory management unit 404 is initialized for instances of the code. The domain array map 402 is initialized by mapping the virtual addresses for the code areas of the multiple instances to a shared domain code area 434 of physical address space 408. Thus, each of the instances executes program code which resides in a shared portion of the physical memory 104. It is important to note that the computer program must be compiled as position independent code so that the code can be located anywhere in the virtual address space.

At step 708, the virtual addresses for the data and stack areas for each of the instances are mapped to respective, dedicated portions of the physical memory 104. Thus, each instance shares the physical memory having the program code and has a dedicated portion of physical memory for data and a stack area. See FIG. 3 for an illustration of the mappings of the domain array 302 virtual addresses to physical address space 408.

Figure 7:
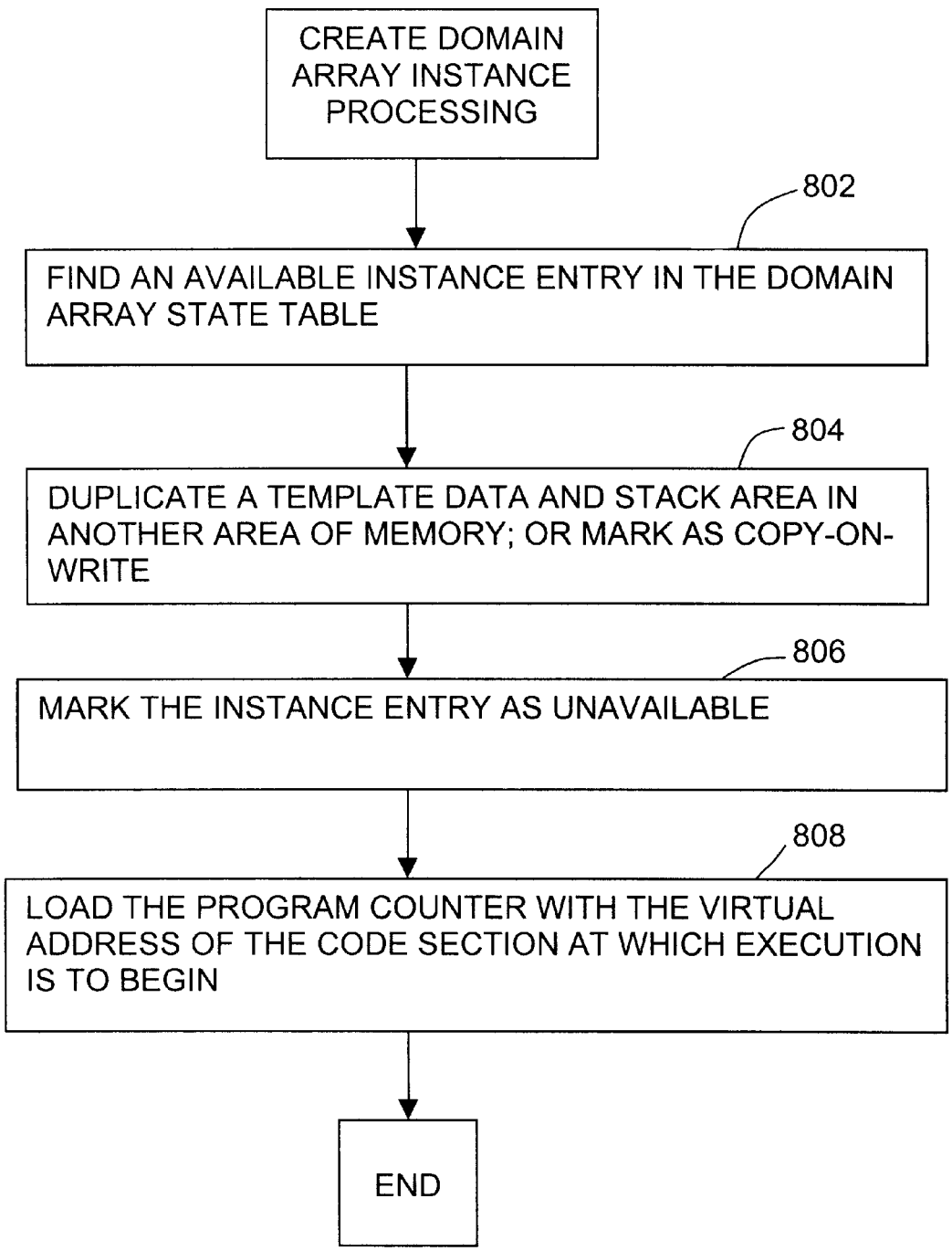
FIG. 7 is a flowchart of the processing for creating an instance of the domain array.

FIG. 7 is a flowchart of the processing for creating an instance of the domain array 302. An instance is "created" to initiate processing of a request by the shared domain code 434. Step 802 finds an available instance in the domain array state table 304 by testing the availability flags associated with the entries in the table. A cleared availability flag indicates that the entry is available.

The data and stack area sections (e.g., 314, 316) for an active instance are duplicated from a template instance in another area of physical address space 408 at step 804. Alternatively, the data and stack area sections are marked as copy-on-write. In a copy-on-write implementation, the data and stack areas will share mappings with the template until the instance writes a page. Thereafter, a private copy of the page is made available after copying.

At step 806, the instance is marked as unavailable by clearing the associated availability flag. The virtual address of the program code for the instance is loaded into the program counter at step 808. Creation of the instance is then complete and the CPU 102 begins execution of the shared domain code 434.

Figure 8:
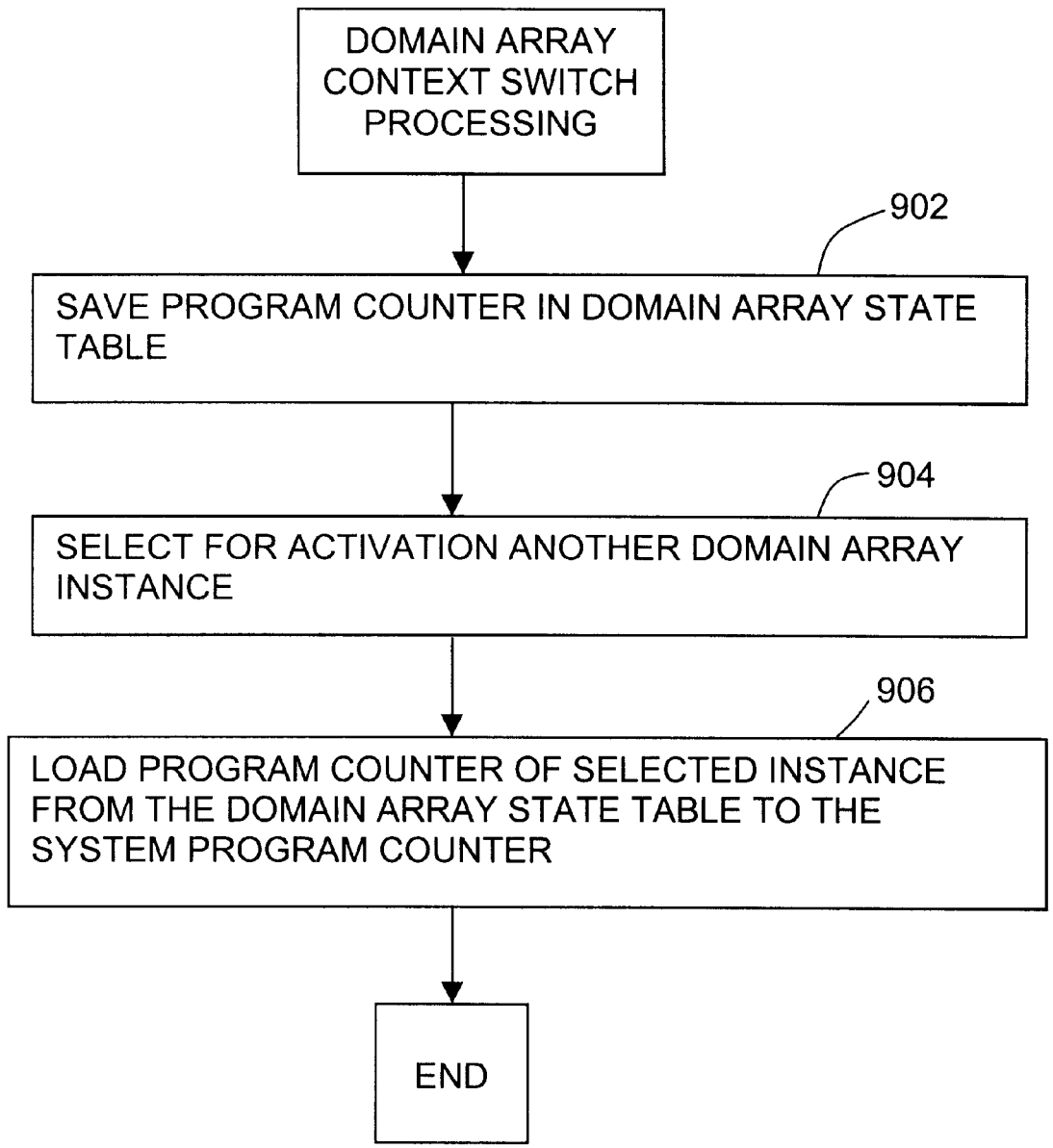
FIG. 8 is a flowchart of the processing for switching the CPU from execution of the shared domain code on behalf of a first instance to execution of the shared domain code on behalf of another instance.

FIG. 8 is a flowchart of the processing for switching the CPU 102 from execution of the shared domain code 434 on behalf of a first instance to execution of the shared domain code on behalf of another instance. At step 902, the program counter is saved in the domain array state table 304 in the cell for the program counter of the instance whose processing is being interrupted.

Another instance of the domain array is selected for activation at step 904. Note that the flowchart assumes that processing is switching from one instance of the domain array 302 to another instance of the domain array, rather than to a different computer program executing on the computer system 100. Selection of the next instance to continue execution may be made using conventional techniques.

At step 906, the program counter register 606 is loaded with the saved program counter from the domain array state table 304. The saved program counter is read from the cell associated with the instance selected for execution from step 904. After the program counter register is loaded, the CPU continues execution of the selected instance in the shared domain code 434, and context switch processing is complete.

Note that overhead processing for context switching is reduced because the domain array memory map 402 remains static within the memory management unit 404, and therefore, does not need to be reinitialized as would be required to switch to a different computer program.

Figure 9:
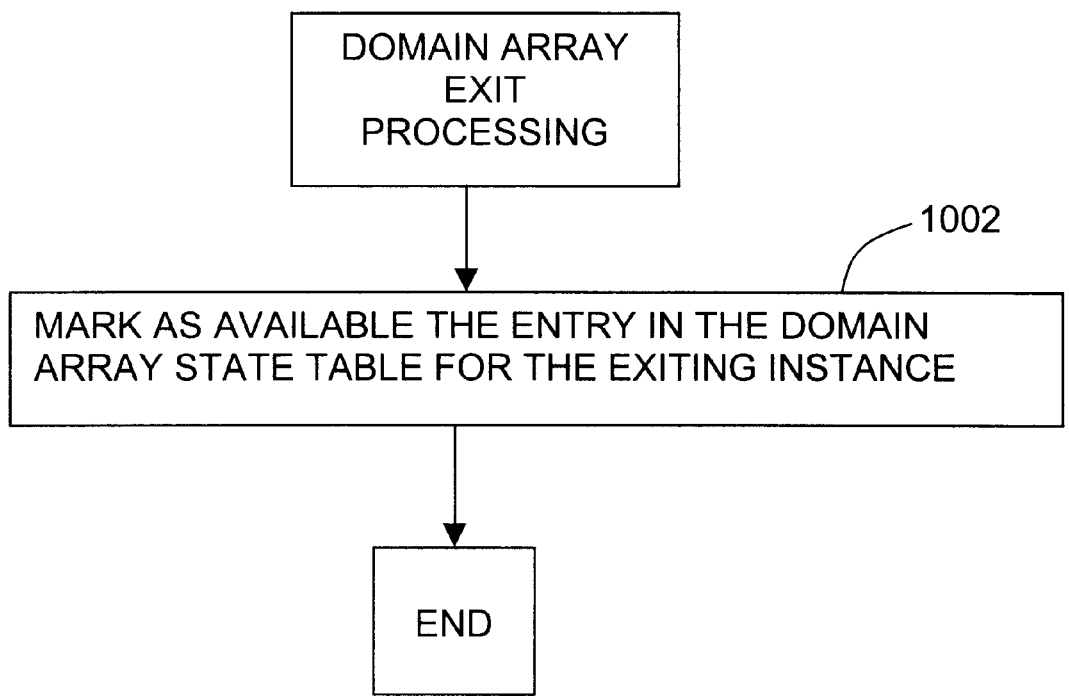
FIG. 9 is a flowchart of the processing performed when an instance completes its processing.

FIG. 9 is a flowchart of the processing performed when an instance completes its processing. Note that only one step is shown, which illustrates the efficiency achieved in using the present invention. At step 1002, the availability flag in the domain array state table 304 for the completed instance is set to indicate that the instance is available to process a subsequent request.

The overhead is reduced for exit processing a domain array instance because the mappings in the domain array map 402 remain, the operating system 124 retains the swap space reserved for the domain array 302, and a full context switch is not required if another instance of the domain array 302 is next selected for execution.

The exemplary embodiments described herein are for purposes of illustration and are not intended to be limiting. Therefore, those skilled in the art will recognize that other embodiments could be practiced without departing from the scope and spirit of the claims set forth below.

What is claimed is:

1. A method for managing memory space for a computer program, comprising the steps of:

reserving a portion of at least one virtual address space for a simultaneous plurality of instances of the computer program, each instance having virtual address space reserved for program code and data;

mapping virtual addresses of the program code for the plurality of instances to shared physical address space storing the executable code; and mapping virtual addresses of data areas for the plurality of instances to respective dedicated portions of physical address space, each of the plurality of instances, upon exiting, having a virtual-to-physical address mapping which is maintained for later use.

2. The method of claim 1, further comprising the step of switching execution from a first instance to a second instance of the computer program, wherein the first instance and the second instance can be in a virtual address space, said switching step including the steps of:

using a state table to save a program counter for the first instance;

selecting the second instance; and using a state table to load a program counter for the second instance.

3. The method of claim 1, further comprising the step of creating an instance of the computer program, said creating step including the steps of:

finding an instance associated with an entry marked available in a state table;

reusing the virtual-to-physical address mapping for the found instance;

performing a task in a group consisting of duplicating a template data and stack area for the found instance and marking a data and stack area for the found instance as copy-on-write;

marking the found instance as unavailable; and loading into a program counter a virtual address of the program code for the found instance.

4. The method of claim 1, upon creating one of the plurality of instances, further comprising the step of reusing a virtual-to-physical address mapping for the created instance.

5. The method of claim 1 further comprising the step of, upon exiting each of the plurality of instances, marking as available a state table entry associated with the exited instance.

6. The method of claim 1, further comprising the steps of:

establishing a state table having a plurality of entries, one for each of the plurality of instances of the computer program;

associating each entry in the state table with a portion of virtual address space;

marking as available an entry in the state table when no instance of the computer program is executing in the associated portion of virtual address space; and marking as unavailable an entry in the state table when a instance of the computer program is executing in the associated portion of virtual address space.

7. A method for managing memory space for a computer program, comprising the steps of:

reserving a portion of virtual address space for a plurality of instances of the computer program, each instance having virtual address space reserved for program code and data;

mapping virtual addresses of the program code for the plurality of instances to shared physical address space having the executable code;

mapping virtual addresses of data areas for the plurality of instances to respective dedicated portions of physical address space;

switching execution from a first instance to a second instance of the computer program, said switching step including the steps of saving a system virtual address program counter in a predetermined storage location for a program counter of the first instance; and loading a virtual address program counter from a predetermined storage location for a program counter of the second instance as a system virtual address program counter;

establishing a state table having a plurality of entries, one for each of the plurality of instances of the computer program;

associating each entry in the state table with a portion of virtual address space;

marking as available an entry in the state table when no instance of the computer program is executing in the associated portion of virtual address space; and marking as unavailable an entry in the state table when an instance of the computer program is executing in the associated portion of virtual address space.

8. A method for managing memory space for a computer program, comprising the steps of:
reserving a portion of virtual address space for a plurality of instances of the computer program, each instance having virtual address space reserved for program code and data;
mapping virtual addresses of the program code for the plurality of instances to shared physical address space having the executable code;
mapping virtual addresses of data areas for the plurality of instances to respective dedicated portions of physical address space;
switching execution from a first instance to a second instance of the computer program, including the steps of
saving a system virtual address program counter in a predetermined storage location for a program counter of the first instance; and
loading a virtual address program counter from a predetermined storage location for a program counter of the second instance as a system virtual address program counter;
initiating an instance of the computer program, including the step of reusing a mapping of virtual address space to physical address space for a data area of an unitiated instance; and
maintaining a mapping of virtual address space to physical address space for a data area of an instance which has completed processing.

9. A method for managing memory space for a computer program, comprising the steps of:
reserving a portion of virtual address space for a plurality of instances of the computer program, each instance having virtual address space reserved for program code and data;
mapping virtual addresses of the program code for the plurality of instances to shared physical address space having the executable code;
mapping virtual addresses of data areas for the plurality of instances to respective dedicated portions of physical address space;
initiating an instance of the computer program, including the step of reusing a mapping of virtual address space to physical address space for a data area of an uninitated instance; and
maintaining a mapping of virtual address space to physical address space for a data area of an instance which has completed processing.

10. A method for managing memory space for a computer program, comprising the steps of:
reserving a portion of virtual address space for a plurality of instances of the computer program, each instance having virtual address space reserved for program code and data;
mapping virtual addresses of the program code for the plurality of instances to shared physical address space having the executable code;
mapping virtual addresses of data areas for the plurality of instances to respective dedicated portions of physical address space; and
maintaining a mapping of virtual address space to physical address space for a data area of an instance which has completed processing.

11. An apparatus for execution management of a computer program, comprising:
means for reserving a portion of at least one virtual address space for a simultaneous plurality of instances of the computer program, each instance having virtual address space reserved for program code and data;
means for mapping virtual addresses of the program code for the plurality of instances to shared physical address space having the executable code; and
means for mapping virtual address of data areas for the plurality of instances to respective dedicated portions of physical address space, each of the plurality of instances, upon exiting, having a virtual-to-physical address mapping which is maintained for later use.

12. A computer-readable medium comprising program instructions for causing a computer to manage execution of a computer program by performing the steps of:
reserving a portion of at least one virtual address space for a simultaneous plurality of instances of the computer program, each instance having virtual address space reserved for program code and data;
mapping virtual addresses of the program code for the plurality of instances to shared physical address space having the executable code; and
mapping virtual addresses of data areas for the plurality of instances to respective dedicated portions of physical address space, each of the plurality of instances, upon exiting, having a virtual-to-physical address mapping which is maintained for later use.

13. A method for creating an instance of a computer program, comprising the steps of:
finding an instance associated with an entry marked available in a state table;
reusing a virtual-to-physical address mapping for the found instance;
performing a task in a group consisting of duplicating a template data and stack area for the found instance and marking a data and stack area for the found instance as copy-on-write;
marking the found instance as unavailable; and
loading into a program counter a virtual address of the program code for the found instance.

14. A method for exiting an instance of a computer program, comprising the steps of:
using a state table having at least one entry associated with one instance;
marking as available the state table entry associated with the exited instance; and
maintaining a virtual-to-physical address mapping for the exited instance.

15. An apparatus for creating an instance of a computer program, comprising:
means for finding an instance associated with an entry marked available in a state table;
means for reusing a virtual-to-physical address mapping for the found instance;
means for performing a task in a group consisting of duplicating a template data and stack area for the found instance and marking a data and stack area for the found instance as copy-on-write;
means for marking the found instance as unavailable; and
means for loading into a program counter a virtual address of the program code for the found instance.

16. An apparatus for exiting an instance of a computer program, comprising:

means for using a state table having at least one entry associated with one instance;

means for marking as available the state table entry associated with the exited instance; and means for maintaining a virtual-to-physical address mapping for the exited instance.

17. A computer-readable medium comprising program instructions for causing a computer to create an instance of a computer program by performing the steps of:

finding an instance associated with an entry marked available in a state table;

reusing a virtual-to-physical address mapping for the found instance;

performing a task in a group consisting of duplicating a template data and stack area for the found instance and marking a data and stack area for the found instance as copy-on-write;

marking the found instance as unavailable; and loading into a program counter a virtual address of the program code for the found instance.

18. A computer-readable medium comprising program instructions for causing a computer to exit an instance of a computer program by performing the steps of:

using a state table having at least one entry associated with one instance;

marking as available the state table entry associated with the exited instance; and maintaining a virtual-to-physical address mapping for the exited instance.

19. A method for switching execution from a first instance to a second instance of a computer program and for maintaining the address mapping for a completed instance, comprising the steps of:

using a state table to save a program counter for the first instance;

selecting the second instance; and using a state table to load a program counter for the second instance;

wherein the first instance and the second instance can simultaneously be in a virtual address space, and each, upon exiting and ceasing further execution of the instance, maintaining a virtual-to-physical address mapping for later use when a new instance of the computer program is created.

20. An apparatus for switching execution from a first instance to a second instance of a computer program and for maintaining the address mapping for a complete instance, comprising:

means for using a state table to save a program counter for the first instance;

means for selecting the second instance; and means for using a state table to load a program counter for the second instance;

wherein the first instance and the second instance can simultaneously be in a virtual address space, and each, upon exiting and ceasing further execution of the instance, maintaining a virtual-to-physical address mapping for later use when a new instance of the computer program is created.

21. A computer-readable medium comprising program instructions for causing a computer to switch execution from a first instance to a second instance of a computer program and for maintaining the address mapping for a complete instance, by a method including the steps of:

using a state table to save a program counter for the first instance;

selecting the second instance; and using a state table to load a program counter for the second instance;

wherein the first instance and the second instance can simultaneously be in a virtual address space, and each, upon exiting and ceasing further execution of the instance, maintaining a virtual-to-physical address mapping for later use when a new instance of the computer program is created.

* * * * *